United States Patent
Ahuja et al.

(10) Patent No.: US 9,775,181 B2
(45) Date of Patent: Sep. 26, 2017

(54) REDUCING RE-ASSOCIATION TIME FOR STA CONNECTED TO AP

(71) Applicant: QUALCOMM Incorporated, San Diego, CA (US)

(72) Inventors: Sachin Ahuja, Hyderabad (IN); Ganesh Kondabattini, Hyderabad (IN); Ganesh Babu Kumaravel, Hyderabad (IN); Mukul Sharma, Hyderabad (IN); Vidyullatha Kanchanapally, Hyderabad (IN); Santhosh Kumar Padma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 14/750,499

(22) Filed: Jun. 25, 2015

(65) Prior Publication Data
US 2016/0381718 A1    Dec. 29, 2016

(51) Int. Cl.
  *H04W 12/04*   (2009.01)
  *H04W 76/02*   (2009.01)
  *H04W 12/06*   (2009.01)
  *H04W 84/12*   (2009.01)

(52) U.S. Cl.
  CPC ........... *H04W 76/02* (2013.01); *H04W 12/06* (2013.01); *H04W 84/12* (2013.01)

(58) Field of Classification Search
  CPC ..... H04W 12/06; H04W 76/02; H04W 84/12; H04W 88/08; H04W 92/10; H04W 88/12; H04W 12/04
  See application file for complete search history.

(56) References Cited

U.S. PATENT DOCUMENTS

| 7,275,157 B2 * | 9/2007 | Cam Winget ..... H04W 36/0088 380/272 |
| 7,350,077 B2 | 3/2008 | Meier et al. |
| 8,107,630 B2 * | 1/2012 | Oh ........................ H04L 63/062 380/278 |

(Continued)

FOREIGN PATENT DOCUMENTS

WO    WO-2014094615 A1    6/2014

OTHER PUBLICATIONS

Chi K.H., et al., "Fast Handoff among IEEE 802.11r Mobility Domains," Journal of Information Science and Engineering, 2010, vol. 26, pp. 1345-1362.

(Continued)

*Primary Examiner* — Ahmed Elallam
(74) *Attorney, Agent, or Firm* — Paradice and Li LLP

(57) ABSTRACT

A method and apparatus for re-associating a station (STA) to an access point (AP). The STA sends a re-association request to the AP to initiate a re-association process with the AP. The re-association request indicates that a handshake operation is to be bypassed during the re-association process. The STA receives a re-association response from the AP in response to the re-association request and, upon receiving the re-association response, enables data communications with the AP using a set of preexisting cryptographic keys. For example, the set of preexisting cryptographic keys may be negotiated with the AP during at least one of a prior association process or a prior re-association process.

26 Claims, 8 Drawing Sheets

(56) References Cited

U.S. PATENT DOCUMENTS

| | | | |
|---|---|---|---|
| 8,812,833 B2* | 8/2014 | Liu | H04W 12/04 370/338 |
| 9,231,760 B2* | 1/2016 | Qi | H04W 12/04 |
| 2012/0110324 A1* | 5/2012 | Geng | H04L 63/061 713/155 |
| 2013/0095789 A1* | 4/2013 | Keevill | H04W 12/06 455/411 |
| 2013/0196708 A1* | 8/2013 | Narasimhan | H04L 9/0827 455/525 |
| 2013/0203384 A1* | 8/2013 | Narasimhan | H04L 63/0227 455/411 |
| 2013/0305332 A1* | 11/2013 | Narasimhan | H04W 12/04 726/7 |
| 2014/0204932 A1 | 7/2014 | Rudolf et al. | |
| 2014/0273884 A1 | 9/2014 | Mantravadi et al. | |
| 2014/0337950 A1* | 11/2014 | Yang | H04W 12/08 726/7 |
| 2014/0355564 A1 | 12/2014 | Cherian et al. | |
| 2015/0334571 A1* | 11/2015 | Xu | H04W 12/04 455/410 |

OTHER PUBLICATIONS

He C., et al., "Security Analysis and Improvements for IEEE 802.11i", Internet Citation, Jan. 12, 2005 (Jan. 12, 2005), pp. 1-19, XP002682945.

"IEEE P802.11 s/D11.0 Draft Standard for Information Technology Telecommunications and information exchange between systems Local and metropolitan area networks Specific requirements Part 11: Wireless LAN Medium Access Control (MAC) and Physical Layer (PHY) specifications Amendment 10: Mesh Networking", Apr. 1, 2011 (Apr. 1, 2011), pp. 1-349, XP055036118.

International Search Report and Written Opinion—PCT/US2016/031542—ISA/EPO—Jul. 26, 2016.

* cited by examiner

REDUCING RE-ASSOCIATION TIME FOR STA CONNECTED TO AP

TECHNICAL FIELD

The present embodiments relate generally to wireless networks, and specifically to reducing a re-association time between a wireless station and an access point.

BACKGROUND OF RELATED ART

A Wi-Fi network may be formed by one or more access points (APs) that provide a wireless communication channel or link with a number of client devices or stations (STAs). Establishing a Wi-Fi connection between an AP and a STA typically involves a number of steps that must be completed (in order) before the STA and AP can begin exchanging data with one another. First, the STA scans all available channels (e.g., by broadcasting probe requests and/or listening for beacon frames) to identify APs and/or other devices that are within Wi-Fi communication range. Each available AP may respond to a probe request by sending back a probe response containing basic service set (BSS) information pertaining to that AP's network. Next, the STA selects one of the APs to connect to, based on the associated network information. For example, the STA may select the AP with the highest signal strength. The STA then authenticates and associates with the selected AP. Finally, the STA performs a 4-way handshake with the AP to generate dynamic keys for encrypting (and decrypting) data communicated between the devices.

Once connected, the STA may subsequently attempt to change or update one or more connection settings (e.g., by enabling or disabling one or more features or capabilities of the AP). For example, the STA may update the connection settings with the AP by sending a re-association request (e.g., with the updated settings) to the AP. If re-association is successful, the AP may send a re-association response back to the STA indicating acceptance of the updated settings. A successful re-association is typically followed by another handshake operation between the STA and the AP. This handshake is similar, if not identical, to the handshake operation that is performed when the STA initially associates to the AP (e.g., when a connection between the STA and the AP was first established), and may consume a considerable amount of time.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for reducing a re-association time between a wireless station (STA) and an access point (AP) are disclosed. The STA sends a re-association request to the AP to initiate a re-association process. The re-association request indicates that a handshake operation is to be bypassed during the re-association process. The STA receives a re-association response from the AP indicating acceptance of the re-association request and, upon receiving the re-association response, may enable data communications with the AP using a set of preexisting cryptographic keys. For example, the preexisting cryptographic keys may be negotiated with the AP during at least one of a prior association process or a prior re-association process.

The handshake operation may comprise an exchanging of Extensible Authentication over Local Area Network (EAPoL) frames between the STA and the AP. In some examples, the re-association request may include a vendor-specific information element indicating that the handshake operation is to be bypassed. Alternatively, a sequence control field of the re-association request may be modified to indicate that the handshake operation is to be bypassed.

The STA may send the re-association request to the AP with which the STA is still associated. In particular, the re-association request may be used to update one or more connection settings with the AP. For example, the STA may send the re-association request to the AP in response to enabling Bluetooth communications on the STA. Thus, the re-association request may be to disable unscheduled automatic power save delivery (U-APSD) for data communications with the AP. For another example, the STA may send the re-association request to the AP in response to disabling Bluetooth communications on the STA. Thus, the re-association request may be to enable U-APSD for data communications with the AP.

The methods of operation disclosed herein enable a wireless station to quickly re-associate to an access point. For example, in certain applications, a wireless station may send a re-association request to a connected access point to update one or more wireless connection settings with the access point. Because the station is already connected to the access point, performing another handshake operation during the re-association process may be redundant and time consuming. By using preexisting cryptographic keys (e.g., negotiated during a prior association or re-association event), the wireless station and access point may quickly re-associate with one another without performing another handshake operation.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Figure 1:
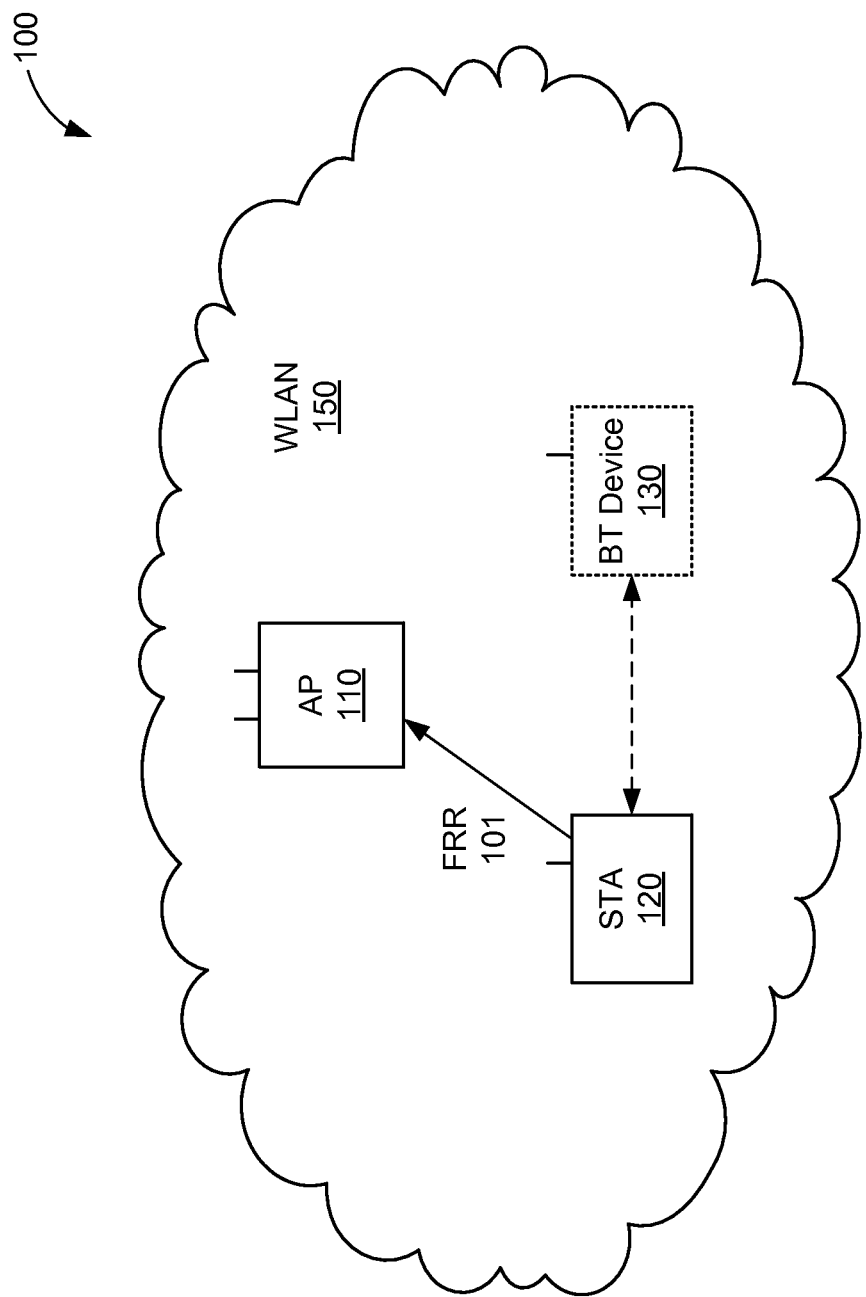
FIG. 1 shows a block diagram of a wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth), Hiper-LAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots.

In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "connected AP" refers to an AP that a given STA is currently associated and/or connected to (e.g., there is an established communication channel or link between the AP and the given STA).

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 is a block diagram of a wireless system 100 within which the example embodiments may be implemented. The wireless system 100 is shown to include a wireless access point (AP) 110, a wireless station (STA) 120, and a wireless local area network (WLAN) 150. The WLAN 150 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 150 may be formed by any number of access points such as AP 110. The AP 110 is assigned a unique media access control (MAC) address. Although the WLAN 150 is depicted in FIG. 1 as an infrastructure basic service set (BSS), for other example embodiments, WLAN 150 may be an independent basic service set (IBSS), an ad-hoc network, or a peer-to-peer (P2P) network (e.g., operating according to the Wi-Fi Direct protocols).

The STA 120 may be any suitable Wi-Fi enabled wireless device including, for example, a cell phone, personal digital assistant (PDA), tablet device, laptop computer, or the like. The STA 120 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, the STA 120 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 6.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For some embodiments, the AP 110 may be any suitable wireless device (e.g., such as a wireless STA) acting as a software-enabled access point ("SoftAP"). For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 7.

For the AP 110 and/or STA 120, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers may be any technically feasible transceiver such as a ZigBee transceiver described by the ZigBee specification, a WiGig transceiver, and/or a HomePlug transceiver described in a specification from the HomePlug Alliance.

To establish an initial Wi-Fi connection, the STA 120 may transmit or broadcast probe requests to the AP 110. For example, the probe request may indicate a number of communication capabilities supported by the STA 120. When the AP 110 receives a probe request from the STA 120, the AP 110 may respond by sending a probe response that mirrors the information provided in the probe request intersected with the capabilities supported by the AP 110. Upon receiving the probe response from the AP 110, the STA 120 may transmit an authentication request to the AP 110. For example, the authentication request may trigger a low-level authentication mechanism described by the IEEE 802.11 specification. The AP 110 responds to the authentication request by sending an authentication response back to the STA 120 to complete the authentication process.

Once authenticated, the STA 120 may then send an association request to the AP 110. For example, the association request may include one or more requested capabilities (e.g., under the IEEE 802.11 specification) to be used for data communications between the STA 120 and the AP 110. If the AP 110 is able to support the requested capabilities indicated in the association request, the AP 110 may create an Association ID (AID) for the STA 120 and send an association response back to the STA. The AP 110 may then initiate a handshake operation to generate dynamic keys to be used for encrypting and decrypting data communications between the two devices. For example, the handshake operation may correspond to a 4-way handshake, as described in the IEEE 802.11 specification, whereby the STA 120 and the AP 110 exchange Extensible Authentication over Local Area Network (EAPoL) frames with one another to generate a Pairwise Transient Key (PTK) and/or other cryptographic keys to be used for data encryption (and decryption). The STA 120 is connected to the AP 110 (and WLAN 150) once the handshake is completed.

The IEEE 802.11 specification also defines a re-association process which may be initiated by the STA 120 to re-associate to the AP 110. For example, the STA 120 may attempt to re-associate to the AP 110 after it becomes (unintentionally or intentionally) disconnected from the AP 110. The STA 120 may initiate the re-association process by sending a re-association request to the AP 110. The re-association request is substantially similar to the association request used to establish the initial connection between the STA 120 and AP 110. The AP 110 may then send a re-association response back to the STA 120 either accepting or rejecting the re-association request. If the re-association request is accepted, the AP 110 may initiate another handshake operation with the STA 120 to generate a new set of dynamic keys to be used for encrypting and decrypting data communications between the two devices.

As described above, the re-association mechanism is conventionally used for restoring a severed connection or communication link between the STA 120 and the AP 110. Hence, a new set of cryptographic keys is typically generated for the new communication session between the STA 120 and the AP 110. However, in some instances, the STA 120 may use the re-association mechanism to update one or more wireless connection settings with the AP 110 while remaining connected to the AP 110. Thus, without disconnecting from the WLAN 150, the STA 120 may send a re-association request to the AP 110 to enable and/or disable one or more of the requested capabilities to be used for data communications between the STA 120 and the AP 110.

For example, to conserve power, the STA 120 may enter a low-power idle state when the station has no data to send to (and/or receive from) the AP 110. The IEEE 802.11e specification defines an Unscheduled Automatic Power Save Delivery (U-APSD) mechanism which enables the STA 120 to initiate an unscheduled service period with the AP 110 at any time (e.g., without waiting for a beacon frame and/or TIM information) by sending a U-APSD trigger frame to the AP 110. This allows the STA 120 to maintain a connection with the WLAN 150 while remaining in the low-power idle state for longer durations (e.g., without having to periodically wake up to receive beacon frames from the AP 110).

In some instances, it may be desirable to dynamically enable and/or disable the U-APSD mechanism. For example, the STA 120 may activate a Bluetooth connection with a Bluetooth (BT) device 130 while simultaneously connected to the AP 110 (e.g., in a Bluetooth coexistence mode). The STA 120 may be prevented from entering the low-power idle state for as long as the Bluetooth connection is active. Accordingly, it may be desirable to disable U-APSD for the Wi-Fi connection between the STA 120 and AP 110 upon activating the Bluetooth connection between the STA 120 and BT device 130. Similarly, when the Bluetooth connection between the STA 120 and BT device 130 is deactivated, it may be desirable to enable (or re-enable) U-APSD for the Wi-Fi connection between the STA 120 and AP 110.

To enable and/or disable the U-APSD mechanism, the STA 120 may send a re-association request to the AP 110 with updated connection settings (e.g., indicating that U-APSD is to be enabled or disabled). The AP 110 may then send a re-association response back to the STA 120 indicating an acceptance or rejection of the updated connection settings. Conventionally, under the IEEE 802.11 specification, the AP 110 would initiate another handshake operation with the STA 120 to negotiate a new set of cryptographic keys upon accepting the re-association request. However, because the STA 120 is already connected to the AP 110 when sending the re-association request, the subsequent handshake operation may be redundant. Moreover, the STA 120 is unable to initiate data communications with the AP 110 until the handshake is completed, which may consume a significant amount of time.

Figure 2:
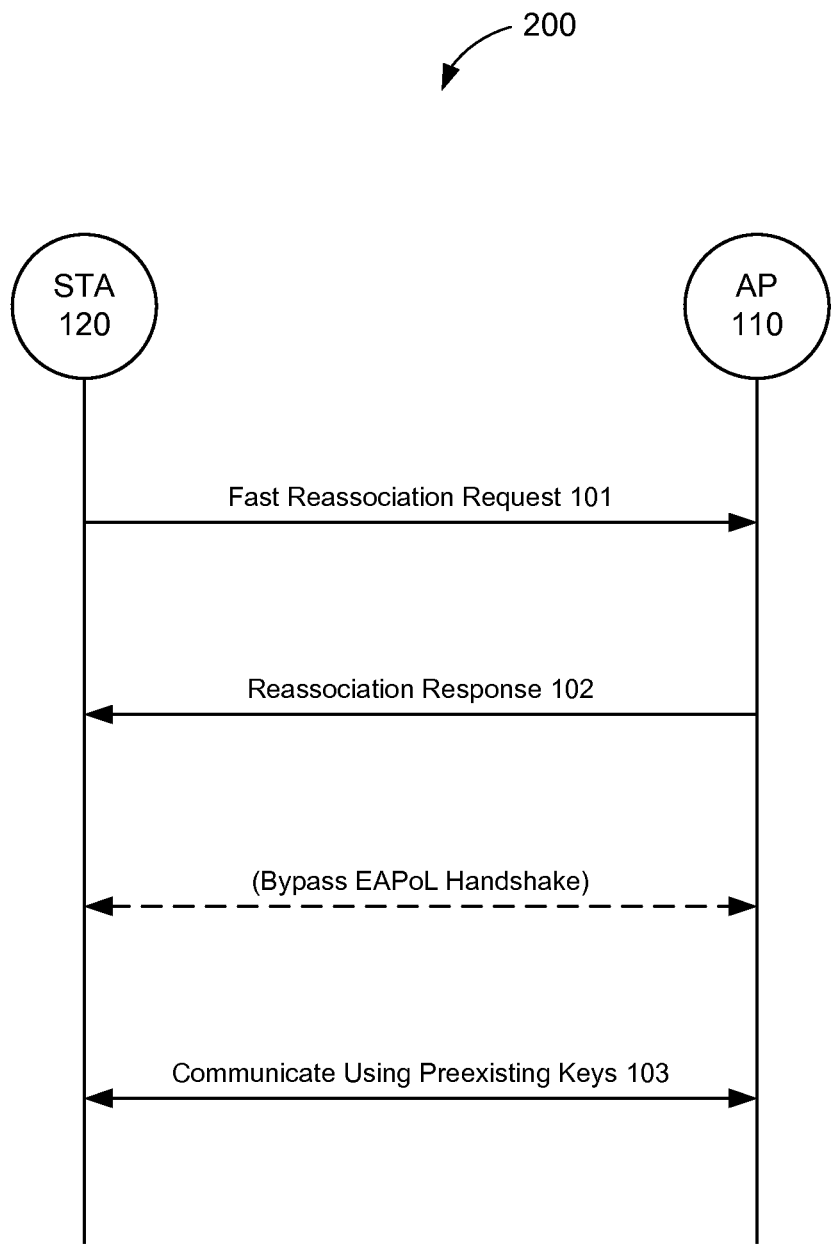
FIG. 2 shows an example sequence diagram depicting a fast re-association between a wireless station (STA) and an access point (AP).

In example embodiments, the STA 120 may initiate a fast re-association process with a connected AP by bypassing the handshake operation that is otherwise performed during a conventional re-association process. For example, with reference to the sequence diagram 200 of FIG. 2, the STA 120 may initiate a fast re-association process by sending a fast re-association request (FRR) frame 101 to the AP 110. If the fast re-association request frame 101 is accepted (e.g., the AP 110 determines that the STA 120 is already connected to the WLAN 150), the AP 110 may send a re-association response 102 back to the STA 120 without initiating a subsequent handshake operation. The STA 120 and AP 110 may then proceed to communicate over the Wi-Fi link using a set of preexisting cryptographic keys 103 (e.g., keys that were negotiated during a prior handshake operation between the STA 120 and AP 110).

For some embodiments, the FRR frame 101 may include a vendor-specific information element (VSIE) indicating a request to bypass the handshake operation during the re-association process. For other embodiments, the FRR frame 101 may be generated by modifying a sequence control field of a re-association request frame. For example, the sequence control field of a typical re-association request frame may include a fragment number (e.g., bits B0-B3) and a sequence number (e.g., bits B4-B15). The fragment number is typically unused (e.g., bits B0-B3 may be initialized to "0"). Thus, the STA 120 may modify the fragment number of a re-association request frame (e.g., by setting one or more of the bits B0-B3 to "1") to indicate a request to bypass the handshake operation during the re-association process.

Figure 3A:
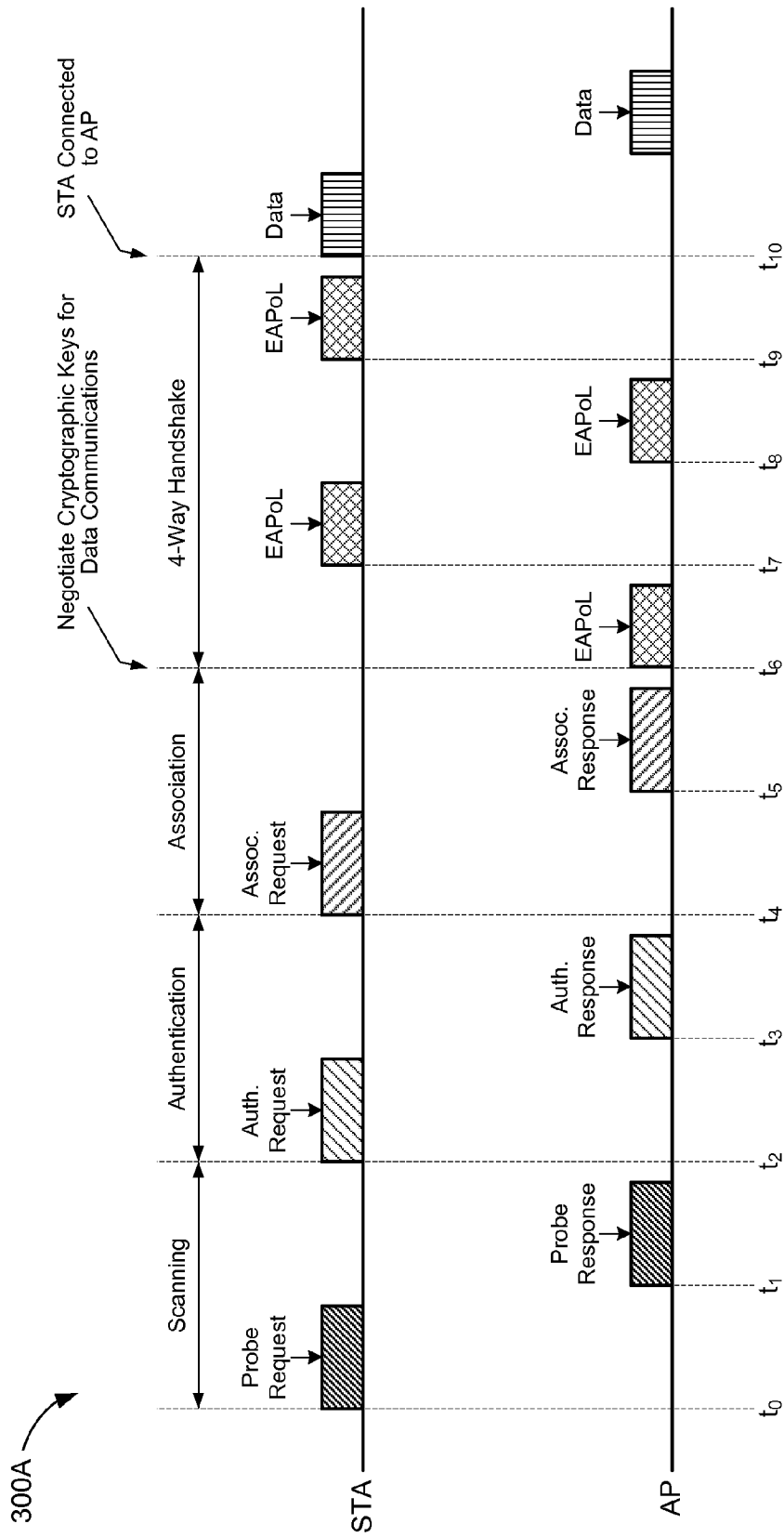
FIGS. 3A-3B show example timing diagrams depicting an operation for updating wireless connection settings between a STA and a connected AP.
Figure 3B:
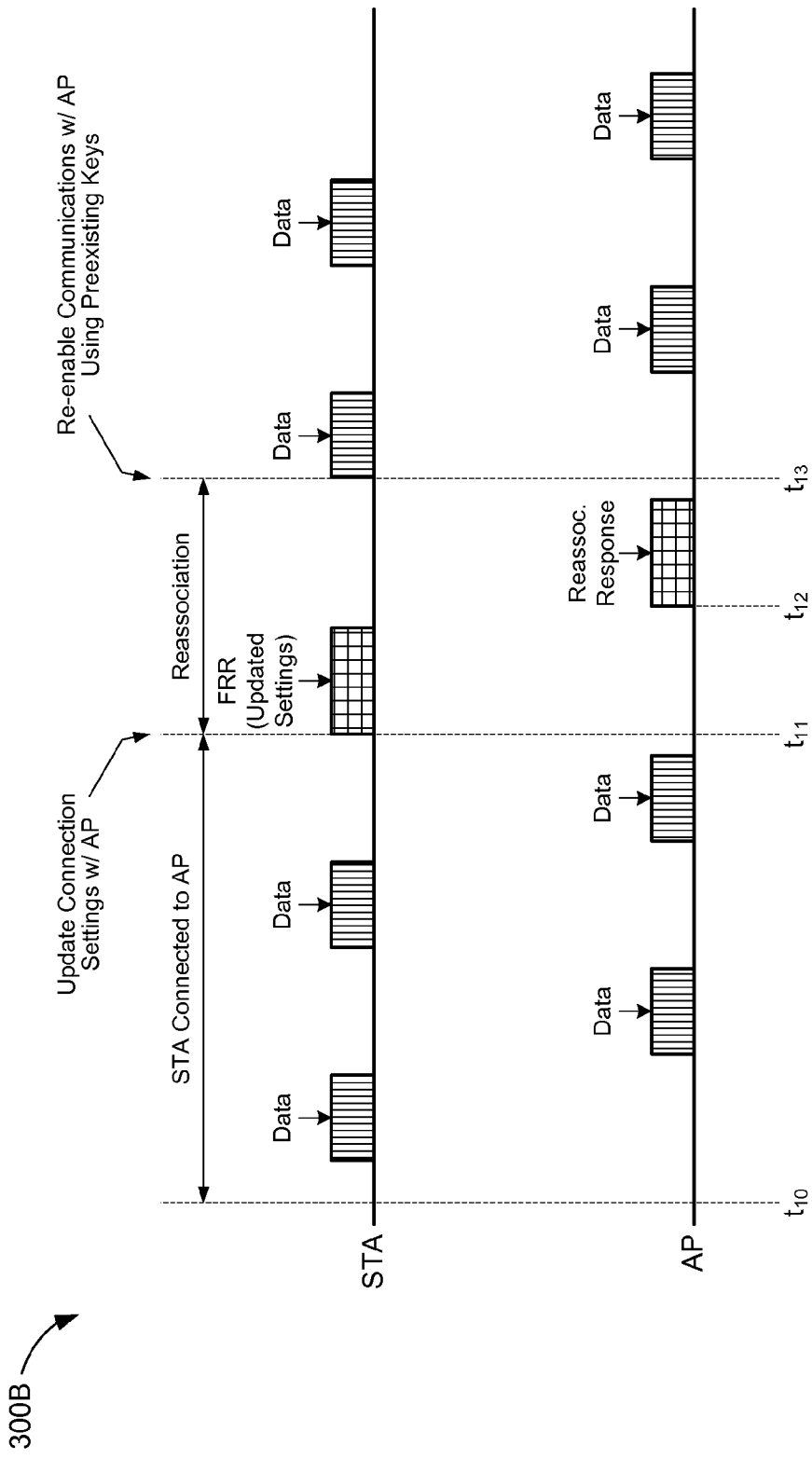

FIGS. 3A-3B show example timing diagrams 300A and 300B, respectively, depicting an operation for updating wireless connection settings between a STA and a connected AP. For purposes of discussion herein, the STA and the AP may be STA 120 and AP 110, respectively, of FIG. 1.

With reference to FIG. 3A, the STA may initially scan for an access point with which to connect (e.g., from times $t_0$ to $t_2$). For example, the STA may broadcast a probe request on a wireless channel associated with the AP at time $t_0$. As described above, the probe request may indicate a number of communication capabilities supported by the STA. The AP responds to the probe request by sending a probe response back to the STA at time $t_1$. For example, the probe response may mirror the information provided in the probe request intersected with the capabilities supported by the AP.

To establish a Wi-Fi connection with the detected AP, the STA and AP may need to authenticate (e.g., from times $t_2$ to $t_4$) and associate (e.g., from times $t_4$ to $t_6$) to one another. During authentication, the STA sends an authentication request to the AP at time $t_2$, and the AP sends an authentication response back to the STA at time $t_3$. For example, the authentication request may trigger a low-level authentication mechanism described by the IEEE 802.11 specification. During association, the STA sends an association request to the AP at time $t_4$, and the AP sends an association response back to the STA at time $t_5$. For example, the association process allows the STA and the AP to negotiate one or more capabilities to be used for subsequent wireless communications between the devices.

Once the devices are associated with one another, the STA and the AP may perform a 4-way handshake (e.g., from times $t_6$ to $t_{10}$) to complete the connection process. The AP may initiate the 4-way handshake, upon successful association with the STA, by sending a first EAPoL frame to the STA, at time $t_6$. The first EAPoL frame may contain a nonce-value associated with the AP (e.g., ANonce), which may be used by the STA to construct a Pairwise Transient Key (PTK) for encrypting and/or decrypting data communications with the AP. The STA responds to the first EAPoL frame by sending a second EAPoL frame to the AP at time $t_7$. The second EAPoL frame may contain a nonce-value associated with the STA (e.g., SNonce) as well as a message integrity code (MIC), which may be used by the AP to construct its own copy of the PTK for encrypting and/or decrypting data communications with the STA.

The AP responds to the second EAPoL frame by sending a third EAPoL frame to the STA at time $t_8$. The third EAPoL frame may contain a Group Temporal Key (GTK), which may be used by the STA (and other STAs in the network) to decrypt multicast or broadcast messages from the AP. The fourth and final EAPoL frame is sent by the STA to the AP, at time $t_9$, to confirm reception of the GTK. A Wi-Fi connection is successfully established between the STA and the AP once the AP receives the fourth EAPoL frame from the STA (e.g., at time $t_9$). Accordingly, the STA (and/or the AP) may initiate secure data communications over the Wi-Fi link at time $t_{10}$.

With reference to FIG. 3B, the STA may attempt to update one or more connection settings with the AP while the devices are still connected via the Wi-Fi link (e.g., at time $t_{11}$). For example, the STA may update the Wi-Fi connection settings in response to activating or deactivating a Bluetooth connection with a Bluetooth device (e.g., BT device 130 of FIG. 1). More specifically, the STA may wish to disable (e.g., if activating the Bluetooth connection) or enable (e.g., if deactivating the Bluetooth connection) U-APSD for the Wi-Fi link. In example embodiments, updates to the connection settings may be effected through a re-association process between the STA and the AP (e.g., from times $t_{11}$ to $t_{13}$).

For example, the STA may trigger the re-association process by sending a fast re-association request (FRR) frame to the AP at time $t_{11}$. The FRR frame may specify the updated connection settings (e.g., that U-APSD is to be enabled or disabled) while also indicating that a handshake operation is to be bypassed during the re-association process. The AP may accept or reject the fast re-association request by sending a re-association response frame back to the STA at time $t_{12}$. For example, the AP may accept the fast re-association request if the AP is able to support the updated connection settings and if the STA is already connected to the AP. If the AP is unable to support the updated connection settings and/or the AP detects that the STA is currently disconnected from the Wi-Fi network, the AP may reject the fast re-association request.

If the AP accepts the fast re-association request (e.g., at time $t_{12}$), the AP may immediately re-enable communications with the STA, at time $t_{13}$, after sending the re-association response to the STA. In example embodiments, the AP may subsequently communicate with the STA using a set of preexisting cryptographic keys (e.g., previously negotiated during the 4-way handshake from times $t_6$ to $t_9$ of FIG. 3). As described above, a new PTK (and possibly a new GTK) may be negotiated each time a new communication session is established between the STA and the AP (e.g., after the STA becomes disconnected from the network). However, in the example of FIG. 3B, the STA initiates the re-association process (e.g., at time $t_{11}$) while still connected to the AP. Thus, in the example embodiments, the STA may resume its current communication session with the AP (e.g., after re-associating to the AP) using the previously-negotiated PTK and GTK.

Figure 4:
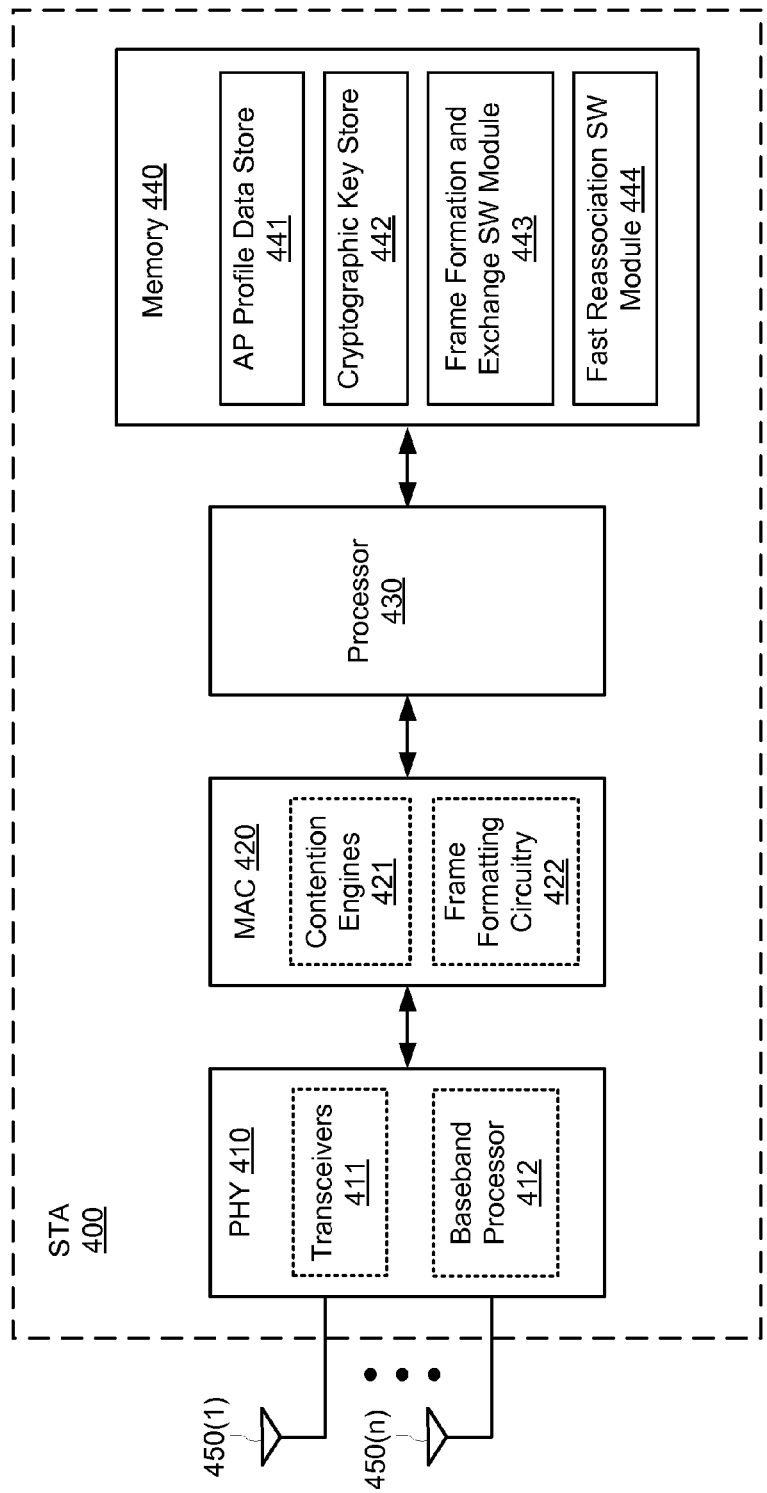
FIG. 4 shows a block diagram of a STA in accordance with example embodiments.

FIG. 4 shows a block diagram of a STA 400 in accordance with example embodiments. The STA 400 may be one embodiment of the STA 120 of FIG. 1. The STA 400 may include a PHY device 410, a MAC 420, a processor 430, a memory 440, and a number of antennas 450(1)-450(n). For purposes of discussion herein, MAC 420 is shown in FIG. 4 as being coupled between PHY device 410 and processor 430. For actual embodiments, PHY device 410, MAC 420, processor 430, and/or memory 440 may be connected together using one or more buses (not shown for simplicity).

The PHY device 410 includes at least a number of transceivers 411 and a baseband processor 412. The transceivers 411 may be coupled to the antennas 450(1)-450(n), either directly or through an antenna selection circuit (not shown for simplicity). The transceivers 411 may be used to transmit signals to and receive signals from AP 110 and/or other STAs (see also FIG. 1), and may be used to scan the surrounding environment to detect and identify nearby access points and/or other STAs (e.g., within wireless range of STA 400). The baseband processor 412 may be used to process signals received from processor 430 and/or memory 440 and to forward the processed signals to transceivers 411 for transmission via one or more of the antennas 450(1)-450(n). The baseband processor 412 may also be used to process signals received from one or more of the antennas 450(1)-450(n) via transceivers 411 and to forward the processed signals to processor 430 and/or memory 440.

The MAC 420 includes at least a number of contention engines 421 and frame formatting circuitry 422. The contention engines 421 may contend for access to one or more shared wireless mediums, and may also store packets for transmission over the one or more shared wireless mediums. For other embodiments, the contention engines 421 may be separate from MAC 420. For still other embodiments, the contention engines 421 may be implemented as one or more software modules (e.g., stored in memory 440 or stored in memory provided within MAC 420) containing instructions that, when executed by processor 430, perform the functions of contention engines 421. The frame formatting circuitry 422 may be used to create and/or format frames received from processor 430 and/or memory 440 (e.g., by adding VSIEs to management frames provided by processor 430, and/or by modifying existing fields of the management frames provided by processor 430). The frame formatting circuitry 422 may also be used to re-format frames received from PHY device 410 (e.g., by stripping MAC headers from frames received from PHY device 410).

Memory 440 may include an AP profile data store 441 that stores profile information for a plurality of APs, and a cryptographic key store 442 that stores associated cryptographic key information for the plurality of APs. The profile information for a particular AP may include information such as, for example, the AP's service set identifier (SSID), the AP's MAC address, channel information, RSSI values, goodput values, channel state information (CSI), supported data rates, connection history with the STA 400, a trustworthiness value of the AP (e.g., indicating a level of confidence about the AP's location, etc.), and any other suitable information pertaining to or describing the operation of the AP. The cryptographic key information may include a PMK, a PTK, and/or a GTK that was last used for encrypting and/or decrypting data communications with a particular AP.

Memory 440 may also include a non-transitory computer-readable medium (e.g., one or more nonvolatile memory elements, such as EPROM, EEPROM, Flash memory, a hard drive, etc.) that may store at least the following software (SW) modules:

a frame formatting and exchange software module 443 to facilitate the create and exchange of any suitable frames (e.g., data frames, action frames, management frames, control frames, etc.) between STA 400 and other wireless devices; and a fast re-association software module 444 to initiate a fast re-association process with a connected AP (e.g., to update one or more connection settings with the AP).

Each software module includes instructions that, when executed by processor 430, causes the STA 400 to perform the corresponding functions. The non-transitory computer-readable medium of memory 440 thus includes instructions for performing all or a portion of the STA-side operations depicted in FIG. 6.

Processor 430 may be any suitable one or more processors capable of executing scripts or instructions of one or more software programs stored in the STA 400 (e.g., within memory 440). For example, processor 430 may execute the frame formatting and exchange software module 443 to facilitate the creation and exchange of any suitable frames (e.g., data frames, action frames, management frames, control frames, etc.) between the STA 400 and other wireless devices. The processor 430 may also execute the fast re-association software module 444 to initiate a fast re-association process with a connected AP (e.g., to update one or more connection settings with the AP).

Figure 5:
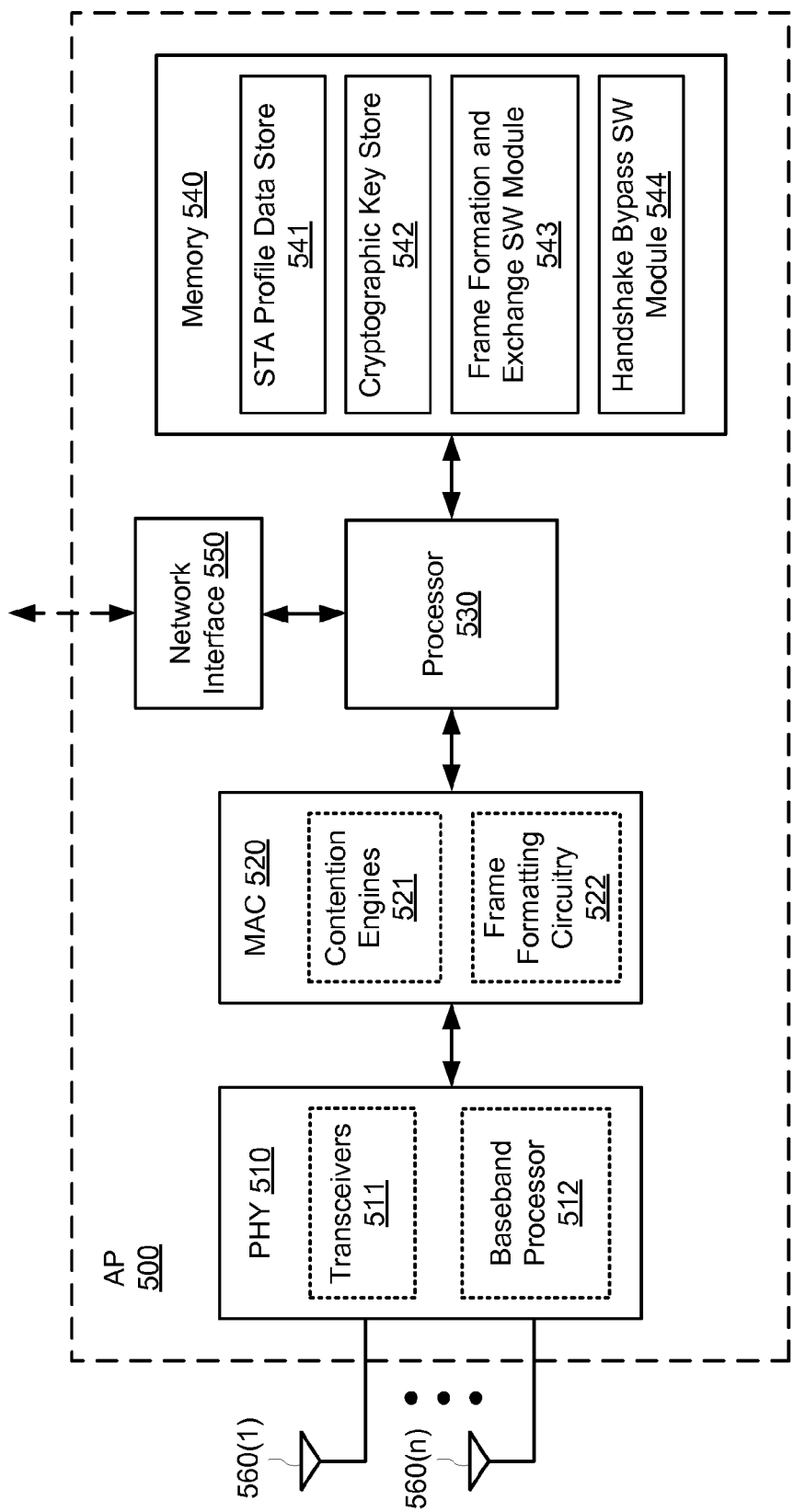
FIG. 5 shows a block diagram of an access point (AP) in accordance with example embodiments.

FIG. 5 shows a block diagram of an AP 500 in accordance with example embodiments. The AP 500 may be one embodiment of the AP 110 of FIG. 1. The AP 500 may include a PHY device 510, a MAC 520, a processor 530, a memory 540, a network interface 550, and a number of antennas 560(1)-560(n). For purposes of discussion herein, MAC 520 is shown in FIG. 5 as being coupled between PHY device 510 and processor 530. For actual embodiments, PHY device 510, MAC 520, processor 530, memory 540, and/or network interface 550 may be connected together using one or more buses (not shown for simplicity).

The PHY device 510 includes at least a number of transceivers 511 and a baseband processor 512. The transceivers 511 may be coupled to the antennas 560(1)-560(n), either directly or through an antenna selection circuit (not shown for simplicity). The transceivers 511 may be used to communicate wirelessly with one or more STAs, with one or more other APs, and/or with other suitable devices. The baseband processor 512 may be used to process signals received from processor 530 and/or memory 540 and to forward the processed signals to transceivers 511 for transmission via one or more of the antennas 560(1)-560(n). The baseband processor 512 may also be used to process signals received from one or more of the antennas 560(1)-560(n) via transceivers 511 and to forward the processed signals to processor 530 and/or memory 540.

The MAC 520 includes at least a number of contention engines 521 and frame formatting circuitry 522. The contention engines 521 may contend for access to the shared wireless medium, and may also store packets for transmission over the shared wireless medium. For other embodiments, the contention engines 521 may be separate from MAC 520. For still other embodiments, the contention engines 521 may be implemented as one or more software modules (e.g., stored in memory 540 or stored in memory provided within MAC 520) containing instructions that, when executed by processor 530, perform the functions of contention engines 521. The frame formatting circuitry 522 may be used to create and/or format frames received from processor 530 and/or memory 540 (e.g., by adding MAC headers to PDUs provided by processor 530). The frame formatting circuitry 522 may also be used to re-format frames received from PHY device 510 (e.g., by parsing VSIEs from management frames received from PHY device 510).

The network interface 550 may be used to communicate with a WLAN server (not shown for simplicity) either directly or via one or more intervening networks, and to transmit signals. For at least some embodiments, the network interface 350 may provide a backhaul connection to one or more wired networks and/or one or more other wireless networks.

Memory 540 may include a STA profile data store 541 that stores profile information for a plurality of STAs, and a cryptographic key store 542 that stores associated cryptographic key information for the plurality of STAs. The profile information for a particular STA may include information such as, for example, the STA's MAC address, previous AP-initiated channel sounding requests, support data rates, connection history with the AP 500, and any other suitable information pertaining to or describing the operation of the STA. The cryptographic key information may include a PMK, a PTK, and/or a GTK that was last used for encrypting and/or decrypting data communications with a particular STA.

Memory 540 may also include a non-transitory computer-readable medium (e.g., one or more nonvolatile memory elements, such as EPROM, EEPROM, Flash memory, a hard drive, etc.) that may store at least the following software (SW) modules:

a frame formatting and exchange software module 543 to facilitate the create and exchange of any suitable frames (e.g., data frames, action frames, management frames, control frames, etc.) between AP 500 and other wireless devices; and a handshake bypass software module 544 to selectively bypass or otherwise refrain from initiating a handshake operation during a re-association process (e.g., in response to a fast re-association request).

Each software module includes instructions that, when executed by processor 530, causes the AP 500 to perform the corresponding functions. The non-transitory computer-readable medium of memory 540 thus includes instructions for performing all or a portion of the AP-side operations depicted in FIG. 7.

Processor 530 may be any suitable one or more processors capable of executing scripts or instructions of one or more software programs stored in the AP 500 (e.g., within memory 540). For example, processor 530 may execute the frame formatting and exchange software module 543 to facilitate the creation and exchange of any suitable frames (e.g., data frames, action frames, management frames, control frames, etc.) between the AP 500 and other wireless devices. The processor 530 may also execute the handshake bypass software module 544 to selectively bypass or otherwise refrain from initiating a handshake operation during a re-association process (e.g., in response to a fast re-association request).

Figure 6:
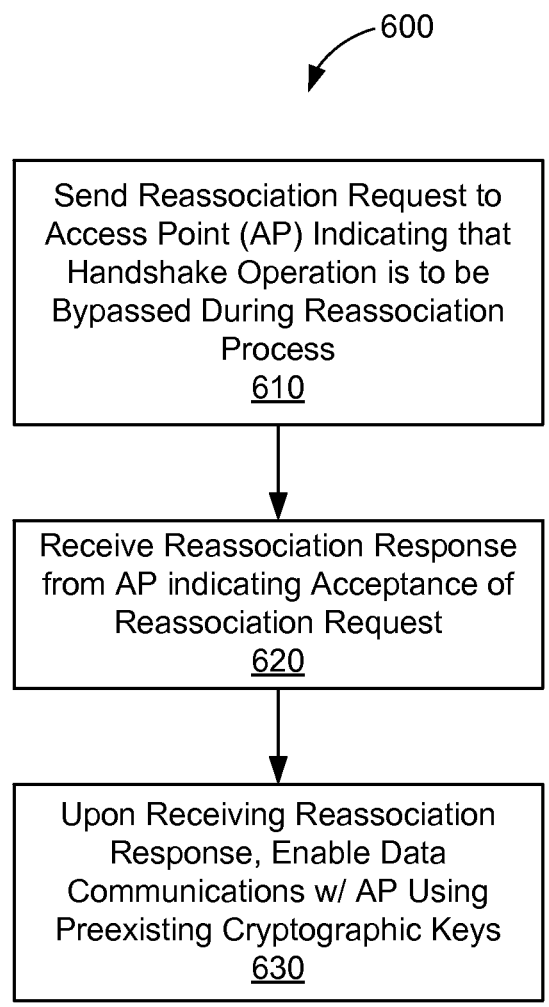
FIG. 6 shows a flowchart depicting an example fast re-association operation.

FIG. 6 shows a flowchart depicting an example fast re-association operation 600. With reference, for example, to FIG. 1, the example operation 600 may be performed by the STA 120 to re-associate to a connected AP (e.g., AP 110) without performing a handshake operation.

The STA 120 may first send a re-association request to the AP 110 to initiate a re-association process (610). In example embodiments, the re-association request may indicate that a handshake operation is to be bypassed during the re-association process. For example, the STA 120 may indicate a request to bypass the handshake operation in a VSIE of the re-association request frame. Alternatively, the STA 120 may modify the fragment number (e.g., of a sequence control field) of the re-association request frame to indicate a request to bypass the handshake operation. For some embodiments, the re-association request may also specify updates to one or more Wi-Fi connection settings with the AP 110. For example embodiments, the request to bypass the handshake operation may be included within any suitable field, information element, header, payload, or other portion of the re-association request frame. For other implementations, the request to bypass the handshake operation may be included within any suitable field, information element, header, payload, or other portion of an action frame, a management frame, or a control frame.

The STA 120 receives a re-association response from the AP 110 indicating acceptance of the re-association request (620). In example embodiments, the AP 110 may accept the re-association request if the STA 120 is already connected to the WLAN 150 (and/or to the AP 110) and the AP 110 is able to support the updated connection settings. More specifically, by accepting the re-association request, the AP 110 may bypass a handshake operation that would otherwise be performed after sending the re-association response to the STA 120 (e.g., during a conventional re-association process). For example, the AP 110 may refrain from sending an EAPoL frame to the STA 120 (e.g., which triggers a 4-way handshake operation) following the re-association response.

Upon receiving the re-association response from the AP 110 indicating acceptance of the re-association request, the STA 120 may enable data communications with the AP 110 using a set of preexisting cryptographic keys (630). As described above, by accepting the re-association request from the STA 120, the AP 110 does not initiate a handshake operation following its re-association response. Thus, the STA 120 may immediately initiate data communications with the AP 110 upon receiving the re-association response. Moreover, because the STA 120 is already engaged in a communication session with the AP 110, the devices may use the cryptographic keys from the current session (e.g., keys that were negotiated during a prior handshake operation between the STA 120 and AP 110) to encrypt and/or decrypt the data communications.

Figure 7:
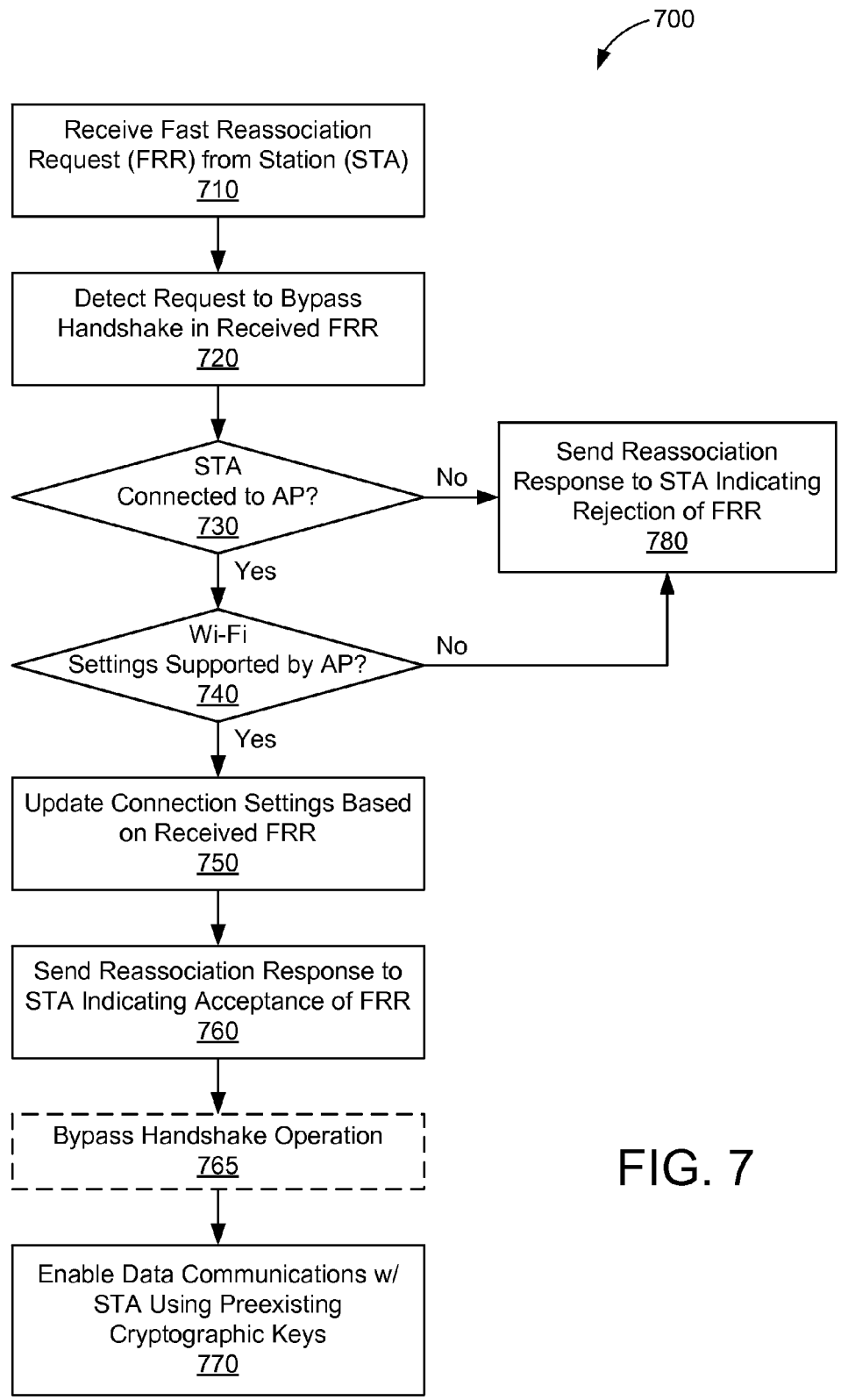
FIG. 7 shows a flowchart depicting an example operation for selectively bypassing a handshake during re-association.

FIG. 7 shows a flowchart depicting an example operation 700 for selectively bypassing a handshake operation during re-association. With reference, for example, to FIG. 1, the example operation 700 may be performed by the AP 110 to bypass a handshake operation in response to a fast re-association request (FRR) frame.

The AP 110 receives a FRR frame from the STA 120 (710), and detects a request to bypass a handshake operation in the received FRR frame (720). For some embodiments, the AP 110 may decode the request to bypass the handshake operation from a VSIE of the FRR frame. In other embodiments, the AP 110 may detect the request to bypass the handshake operation based on modifications to a fragment number (e.g., of a sequence control field) of the FRR frame.

The AP 110 then determines whether the STA 120 is already connected to the AP 110 (730). For example, the STA 120 may use the re-association mechanism to update one or more connection settings with the AP 110 (e.g., while the STA 120 is connected to the AP 110). However, if the STA 120 has been disconnected from the AP 110, then the STA 120 and AP 110 may need to negotiate a new set of cryptographic keys for the new communication session. Thus, if the STA 120 is not connected to the AP 110 (e.g., as tested at 730), the AP 110 may send a re-association response back to the STA 120 indicating a rejection of the fast re-association request (780).

If the STA 120 is connected to AP 110 (e.g., as tested at 730), the AP 110 may then determine whether it is able to support the connection settings provided in the received FRR frame (740). For example, the AP 110 may not be able to support one or more connection settings (e.g., U-APSD) requested by the STA 120, and/or the AP 110 may be unable to accommodate such a configuration at the time of the request. If the AP 110 is unable to update its connection settings in the manner requested by the STA 120 (e.g., as tested at 740), the AP 110 may send a re-association response back to the STA 120 indicating rejection of the fast re-association request (780).

If the AP 110 is able to support the requested connection settings (e.g., as tested at 740), the AP 110 may update its own settings based on the received FRR frame (750), and may send a re-association response frame back to the STA 120 indicating acceptance of the fast re-association request (760). In example embodiments, by accepting the fast re-association request, the AP 110 may bypass a handshake operation (765) that would otherwise be performed after sending the re-association response to the STA 120 (e.g., during a conventional re-association process). For example, by bypassing the handshake operation, the AP 110 may refrain from sending an EAPoL frame to the STA 120 that would typically trigger a 4-way handshake operation (e.g., to negotiate a new set of cryptographic keys).

The AP 110 may then enable data communications with the STA 120 using a set of preexisting cryptographic keys (770). As described above, the AP 110 may simply allow the current communication session with the STA 120 to resume while continuing to use the cryptographic keys (e.g., PTK and/or GTK) from the current session (e.g., keys that were negotiated during a prior handshake operation between the STA 120 and AP 110) to encrypt and/or decrypt the data communications.

In example embodiments, the AP 110 may generate beacon frames that include the custom IE even if the AP 110 does not establish a Wi-Fi connection with the requesting STA. As described above, this may enable the STA to quickly identify the AP 110 (e.g., through passive scanning) and to establish a Wi-Fi connection with the AP 110 if (and when) needed.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of re-associating a station (STA) to an access point (AP), the method being performed by the STA and comprising:
   sending a re-association request to the AP while the STA is connected to the AP to initiate a re-association process, the re-association request indicating that a handshake operation is to be bypassed during the re-association process;
   receiving a re-association response from the AP indicating acceptance of the re-association request; and
   upon receiving the re-association response, enabling data communications with the AP using a set of preexisting cryptographic keys.

2. The method of claim 1, wherein the re-association request is to update one or more connection settings with the AP.

3. The method of claim 1, wherein sending the re-association request to the AP further comprises:
   sending the re-association request to the AP in response to enabling Bluetooth communications on the STA, wherein the re-association request is to disable unscheduled automatic power save delivery (U-APSD) for data communications with the AP.

4. The method of claim 1, wherein sending the re-association request to the AP further comprises:
   sending the re-association request to the AP in response to disabling Bluetooth communications on the STA, wherein the re-association request is to enable unscheduled automatic power save delivery (U-APSD) for data communications with the AP.

5. The method of claim 1, wherein the handshake operation comprises an exchanging of Extensible Authentication over Local Area Network (EAPoL) frames between the STA and the AP.

6. The method of claim 1, wherein the set of preexisting cryptographic keys is negotiated with the AP during at least one of a prior association process or a prior re-association process.

7. The method of claim 1, wherein the re-association request includes a vendor-specific information element indicating that the handshake operation is to be bypassed during the re-association process.

8. The method of claim 1, wherein sending the re-association request comprises:
   modifying a sequence control field of the re-association request to indicate that the handshake operation is to be bypassed during the re-association process.

9. A communications device, comprising:
   a memory element storing instructions for re-associating to an access point (AP); and
   one or more processors that, upon executing the instructions, cause the communications device to:
      send a re-association request to the AP while the communications device is connected to the AP to initiate a re-association process, the re-association request indicating that a handshake operation is to be bypassed during the re-association process;
      receive a re-association response from the AP indicating acceptance of the re-association request; and
      upon receiving the re-association response, enable data communications with the AP using a set of preexisting cryptographic keys.

10. The communications device of claim 9, wherein the re-association request is to update one or more connection settings with the AP.

11. The communications device of claim 9, wherein execution of the instructions to send the re-association request to the AP further causes the communications device to:
    send the re-association request to the AP in response to enabling Bluetooth communications on the communications device, wherein the re-association request is to disable unscheduled automatic power save delivery (U-APSD) for data communications with the AP.

12. The communications device of claim 9, wherein execution of the instructions to send the re-association request to the AP further causes the communications device to:
    send the re-association request to the AP in response to disabling Bluetooth communications on the communications device, wherein the re-association request is to enable unscheduled automatic power save delivery (U-APSD) for data communications with the AP.

13. The communications device of claim 9, wherein the set of preexisting cryptographic keys is negotiated with the AP during at least one of a prior association process or a prior re-association process.

14. The communications device of claim 9, wherein the re-association request includes a vendor-specific information element indicating that the handshake operation is to be bypassed during the re-association process.

15. The communications device of claim 9, wherein execution of the instructions to send the re-association request to the AP causes the communications device to:
    modify a sequence control field of the re-association request to indicate that the handshake operation is to be bypassed during the re-association process.

16. A communications device, comprising:
    means for sending a re-association request to an access point (AP) while the communications device is connected to the AP to initiate a re-association process, the re-association request indicating that a handshake operation is to be bypassed during the re-association process;
    means for receiving a re-association response from the AP indicating acceptance of the re-association request; and
    means for enabling data communications with the AP, upon receiving the re-association response, using a set of preexisting cryptographic keys.

17. The communications device of claim 16, wherein the re-association request is to update one or more connection settings with the AP.

18. The communications device of claim 16, wherein the means for sending the re-association request to the AP is to further:
    send the re-association request to the AP in response to enabling Bluetooth communications on the communications device, wherein the re-association request is to disable unscheduled automatic power save delivery (U-APSD) for data communications with the AP.

19. The communications device of claim 16, wherein the means for sending the re-association request to the AP is to further:
    send the re-association request to the AP in response to disabling Bluetooth communications on the communications device, wherein the re-association request is to enable unscheduled automatic power save delivery (U-APSD) for data communications with the AP.

20. The communications device of claim 16, wherein the set of cryptographic keys is negotiated with the AP during at least one of a prior association process or a prior re-association process.

21. The communications device of claim 16, wherein the means for sending the re-association request to the AP is to further:
modify a sequence control field of the re-association request to indicate that the handshake operation is to be bypassed during the re-association process.

22. A non-transitory computer-readable storage medium containing program instructions that, when executed by a processor of a communications device, causes the communications device to:
send a re-association request to an access point (AP) while the communications device is connected to the AP to initiate a re-association process, the re-association request indicating that a handshake operation is to be bypassed during the re-association process;
receive a re-association response from the AP indicating acceptance of the re-association request; and
upon receiving the re-association response, enable data communications with the AP using a set of preexisting cryptographic keys.

23. The non-transitory computer-readable storage medium of claim 22, wherein the re-association request is to update one or more connection settings with the AP.

24. The non-transitory computer-readable storage medium of claim 22, wherein execution of the instructions to send the re-association request to the AP further causes the communications device to:
send the re-association request to the AP in response to enabling Bluetooth communications on the communications device, wherein the re-association request is to disable unscheduled automatic power save delivery (U-APSD) for data communications with the AP.

25. The non-transitory computer-readable storage medium of claim 22, wherein execution of the instructions to send the re-association request to the AP further causes the communications device to:
send the re-association request to the AP in response to disabling Bluetooth communications on the communications device, wherein the re-association request is to enable unscheduled automatic power save delivery (U-APSD) for data communications with the AP.

26. The non-transitory computer-readable storage medium of claim 22, wherein the set of preexisting cryptographic keys is negotiated with the AP during at least one of a prior association process or a prior re-association process.

* * * * *